(12) United States Patent
Friske et al.

(10) Patent No.: US 11,542,852 B2
(45) Date of Patent: Jan. 3, 2023

(54) HEAT EXCHANGERS WITH ENHANCED EFFICIENCY

(71) Applicant: Ford Global Technologies, LLC, Dearborn, MI (US)

(72) Inventors: Dave D. Friske, Wolverine Lake, MI (US); Christian Hertrich, Allen Park, MI (US); Mark Thomas Weston, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/025,196

(22) Filed: Sep. 18, 2020

(65) Prior Publication Data

US 2022/0090534 A1    Mar. 24, 2022

(51) Int. Cl.
| | |
|---|---|
| *F01P 3/20* | (2006.01) |
| *F28F 13/06* | (2006.01) |
| *F01P 11/04* | (2006.01) |
| *F01M 11/00* | (2006.01) |
| *F16H 57/04* | (2010.01) |
| *B33Y 80/00* | (2015.01) |
| *F01M 5/00* | (2006.01) |
| *F01P 3/18* | (2006.01) |
| *B60L 58/26* | (2019.01) |

(52) U.S. Cl.
CPC .............. *F01P 3/20* (2013.01); *B33Y 80/00* (2014.12); *F01M 5/002* (2013.01); *F01M 11/0004* (2013.01); *F01P 11/04* (2013.01); *F16H 57/0417* (2013.01); *F28F 13/06* (2013.01); *B60L 58/26* (2019.02); *F01P 2003/182* (2013.01); *F01P 2060/04* (2013.01)

(58) Field of Classification Search
CPC ........ F01P 3/20; F01P 11/04; F01P 2003/182; F01P 2060/04; B33Y 80/00; F01M 5/002; F01M 11/0004; F16H 57/0417; F28F 13/06; B60L 58/26
See application file for complete search history.

(56) References Cited

U.S. PATENT DOCUMENTS

| | | | | |
|---|---|---|---|---|
| 4,164,660 A | * | 8/1979 | Palazzetti | F02B 63/04 237/12.3 B |
| 4,773,212 A | * | 9/1988 | Griffin | F02C 7/224 60/39.83 |

(Continued)

FOREIGN PATENT DOCUMENTS

WO    2013163398    10/2013

*Primary Examiner* — Kurt Philip Liethen
(74) *Attorney, Agent, or Firm* — Burris Law, PLLC (57) ABSTRACT

An additive manufactured heat exchanger includes a monolithic housing defining an outer surface, a plurality of first fluid passageways extending between a first fluid inlet and a first fluid outlet, and a plurality of second fluid passageways extending between a second fluid inlet and a second fluid outlet. A cross section of the outer surface defines an irregular shape, the plurality of first fluid passageways and the plurality of second fluid passageways define a convoluted flow matrix within the monolithic housing, and the outer surface of the monolithic housing is complimentary to a space between at least two components of a vehicle. The monolithic housing can also include a plurality of third fluid passageways extending between a third fluid inlet and a third fluid outlet.

20 Claims, 6 Drawing Sheets

(56) References Cited

U.S. PATENT DOCUMENTS

| | | | | |
|---|---|---|---|---|
| 9,453,604 | B1* | 9/2016 | Maloney | F16L 41/00 |
| 10,220,699 | B1* | 3/2019 | Tian | B60K 13/06 |
| 10,809,016 | B2* | 10/2020 | Kironn | B23P 15/26 |
| 11,085,700 | B2* | 8/2021 | Ranjan | B23P 15/26 |
| 11,168,942 | B2* | 11/2021 | Becene | F28D 1/0233 |
| 2013/0206374 | A1* | 8/2013 | Roisin | B22F 7/002 |
| | | | | 165/165 |
| 2014/0251585 | A1* | 9/2014 | Kusuda | F28D 15/04 |
| | | | | 165/164 |
| 2016/0116222 | A1* | 4/2016 | Shedd | F28F 1/36 |
| | | | | 165/166 |
| 2017/0023312 | A1 | 1/2017 | Urbanski | |
| 2017/0030255 | A1* | 2/2017 | Tokozakura | F28D 9/005 |
| 2018/0187984 | A1 | 7/2018 | Manzo | |
| 2018/0245853 | A1* | 8/2018 | Sennoun | F28F 7/02 |
| 2018/0283795 | A1* | 10/2018 | Cerny | F28D 1/0472 |
| 2019/0011187 | A1 | 1/2019 | Bucknell | |
| 2019/0024987 | A1* | 1/2019 | Moore | F28F 3/12 |
| 2019/0120118 | A1* | 4/2019 | Son | F01P 5/10 |

* cited by examiner

HEAT EXCHANGERS WITH ENHANCED EFFICIENCY

FIELD

The present disclosure relates to heat exchangers, and particularly to additively manufactured heat exchangers for use in motor vehicles.

BACKGROUND

The statements in this section merely provide background information related to the present disclosure and may not constitute prior art.

A heat exchanger is an apparatus or system used to transfer heat between two or more fluids, i.e., from at least one "hot" fluid to at least one "cool" fluid, with the fluids typically separated by a solid wall to prevent mixing thereof. And the size and shape of a heat exchanger are determined by the amount of heat generated by, and required to be dissipated from, a heat producing system. Examples of heat producing systems include vehicles with internal combustion engines, battery powered vehicles, hybrid vehicles, among others.

Traditional heat exchanger manufacturing processes include machining and welding pre-fabricated or pre-manufactured components such as heat exchanger housings, tubing, tubing fittings, among others. Accordingly, the flexibility of a heat exchanger design and manufacture are limited by the shape, size and available of such pre-manufactured components.

The present disclosure addresses issues related to the manufacture of heat exchangers, and other issues related to design, shape and size of heat exchangers.

SUMMARY

This section provides a general summary of the disclosure and is not a comprehensive disclosure of its full scope or all of its features.

In one form of the present disclosure, an additively manufactured (AM) heat exchanger includes an AM monolithic housing defining a convoluted flow matrix with at least one first fluid passageway and at least one second fluid passageway. In some variations, a first fluid flowing through the at least one first fluid passageway and a second fluid flowing through the at least one second fluid passageway are included.

In at least one variation, the convoluted flow matrix has at least one of a change in inner dimension along a length direction of the at least one first fluid passageway, a change in inner dimension along a length direction of the at least one second fluid passageway, a change in outer dimension along a length direction of the at least one first fluid passageway, a change in outer dimension along a length direction of the at least one second fluid passageway, and combinations thereof. In some variations, the change in inner dimension along the length direction of the at least one first fluid passageway is a change in an inner diameter of the at least one first fluid passageway, the change in inner dimension along the length direction of the at least one second fluid passageway is a change in an inner diameter of the at least one second fluid passageway, the change in outer dimension along the length direction of the at least one first fluid passageway is a change in wall thickness of the convoluted flow matrix along the length of the at least one first fluid passageway, and the change in outer dimension along the length direction of the at least one second fluid passageway is a change in wall thickness of the convoluted flow matrix along the length of the at least one second fluid passageway.

In some variations, a cross section of an outer surface of the monolithic housing defines an irregular shape. And in at least one variation, the irregular shape of the monolithic housing is complimentary to an irregular shaped space within a vehicle.

In some variations, the monolithic housing is a metallic monolithic housing. In at least one variation, the metallic monolithic housing includes a first portion formed from a first metallic material and a second portion formed from a second metallic material different than the first metallic material.

In at least one variation, the monolithic housing includes a third fluid passageway such that the AM heat exchanger is a plurality of heat exchangers. In such variations the plurality of heat exchangers is selected from a gearbox oil heat exchanger, an engine oil heat exchanger, an engine coolant heat exchanger, an exhaust gas heat exchanger, and a battery coolant heat exchanger.

In some variations, the AM monolithic housing is disposed in a fuel line of a vehicle, while in other variations the AM monolithic housing is disposed in an oil line of a vehicle. In at least one variation, the AM monolithic housing is disposed in an oil reservoir of a vehicle.

In some variations, a vehicle is included and the monolithic housing is at least one of a gearbox oil heat exchanger, an engine oil heat exchanger, an engine coolant heat exchanger, an exhaust gas heat exchanger, and a battery coolant heat exchanger for the vehicle. In at least one variation, the monolithic housing is at least two of the gearbox oil heat exchanger, the engine oil heat exchanger, the engine coolant heat exchanger, the exhaust gas heat exchanger, and the battery coolant heat exchanger for the vehicle. Also, in some variations the vehicle has an irregular shaped space between at least two components of the vehicle and the monolithic housing is complimentary with and disposed within the irregular shaped space.

In another form of the present disclosure, an AM heat exchanger includes a monolithic housing with a plurality convoluted layers defining a plurality of coolant passageways extending between a coolant inlet and a coolant outlet, and a plurality of heated fluid passageways extending between a heated fluid inlet and a heated fluid outlet. The plurality of coolant passageways and the plurality of heated fluid passageway define a convoluted flow matrix within the monolithic housing.

In some variations, the convoluted flow matrix has a coolant passageway with at least one of a change in an inner dimension along a length direction of the coolant passageway, a change in an outer dimension along the length direction of the coolant passageway, and a change in the inner dimension and the outer dimension along the length direction of the coolant passageway. And in at least one variation the convoluted flow matrix has a heated fluid passageway with at least one of a change in an inner dimension along a length direction of the heated fluid passageway, a change in an outer dimension along the length direction of the heated fluid passageway, and a change in the inner dimension and the outer dimension along the length direction of the heated fluid passageway.

In still another form of the present disclosure, an AM heat exchanger includes a monolithic housing defining an outer surface, a plurality of first fluid passageways extending between a first fluid inlet and a first fluid outlet, and a plurality of second fluid passageways extending between a second fluid inlet and a second fluid outlet. Also, a cross section of the outer surface defines an irregular shape, the plurality of first fluid passageways and the plurality of second fluid passageways define a convoluted flow matrix within the monolithic housing, and the outer surface of the monolithic housing is complimentary to a space between at least two components of a vehicle. In some variations, the monolithic housing also includes a plurality of third fluid passageways extending between a third fluid inlet and a third fluid outlet.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
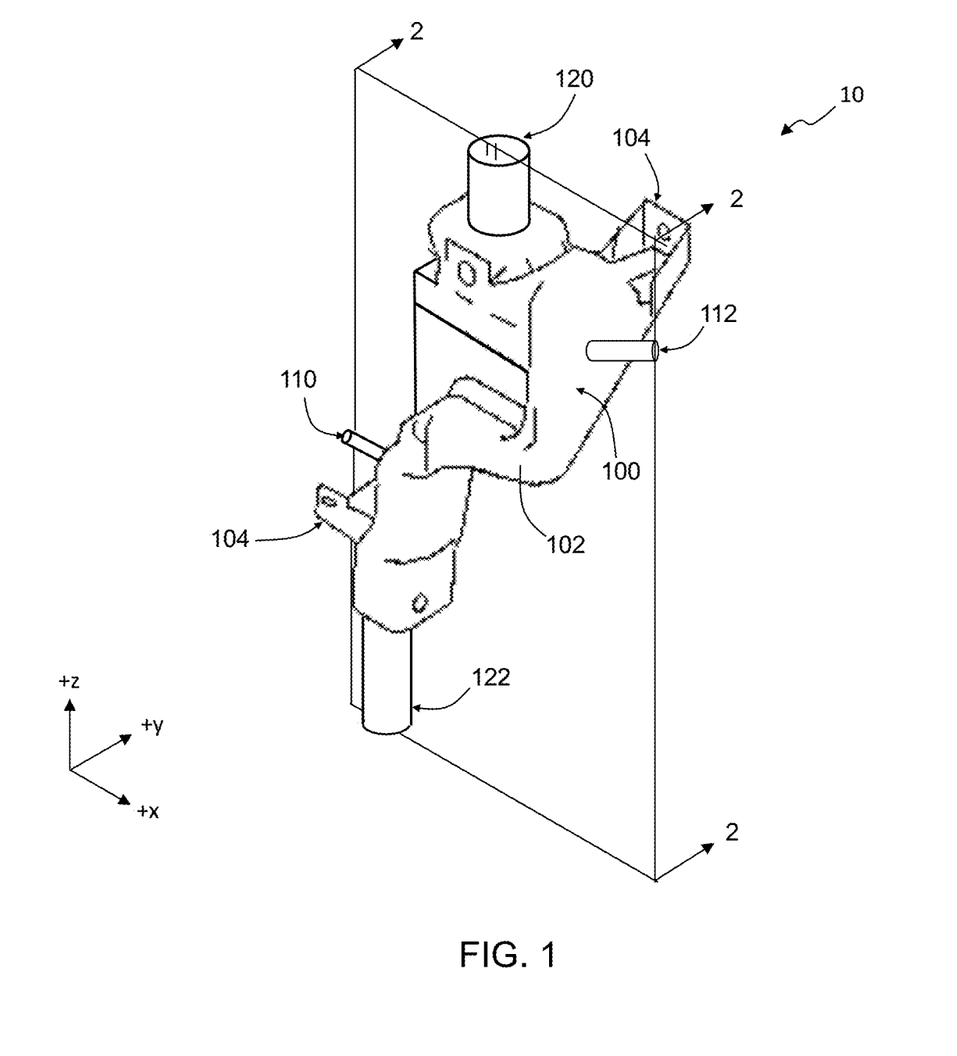
FIG. 1 is a perspective view of a heat exchanger according to one form of the present disclosure.

Referring to FIG. 1, a heat exchanger 10 according to the teachings of the present disclosure is shown. The heat exchanger 10 includes a housing 100 with an outer surface 102, a first fluid inlet 110, a first fluid outlet 112, a second fluid inlet 120, and a second fluid outlet 122. In some variations, the first fluid inlet 110 is a heated fluid inlet, the first fluid outlet 112 is a heated fluid outlet, the second fluid inlet 120 is a cooling fluid (also referred to herein as a "coolant") inlet, and the second fluid outlet 122 is a coolant outlet. While in other variations, the first fluid inlet 110 is a coolant inlet, the first fluid outlet 112 is a coolant outlet, the second fluid inlet 120 is a heating fluid inlet, and the second fluid outlet 122 is a heating fluid outlet. In at least one variation the housing 100 includes one or more brackets 104 configured to attach the housing 100 to a structure (not shown) such as a vehicle frame, a vehicle engine, a vehicle body, among others. In some variations, a cross section of the housing outer surface 102 defines an irregular shape. As used herein, the phrase "irregular shape" refers to a two dimensional (2D) shaped with sides and interior angles that are not all the same.

In some variations the housing 100 is a monolithic housing 100 formed by additive manufacturing (AM). Non-limiting examples of techniques or methods of AM used to make the housing 100 include selective laser melting (SLM), electron beam melting (EBM), laser metal deposition (LMD), and metal binder jetting, among others. Also, non-limiting examples of materials used for forming the housing 100 include powders and/or wires of aluminum, aluminum alloys, copper, copper alloys, iron, iron alloys (including steels and stainless steels), nickel, nickel alloys, magnesium, magnesium alloys, and combinations thereof, among others. The flexibility of designs and shapes that can be produced using AM provide or allow for the fabrication of housings 100 with a range of shapes and properties and/or provide or allow for a single housing 100 that has a range of properties (e.g., heat transfer) as a function of spatial position or location of the housing 100 as described in greater detail below.

Figure 2:
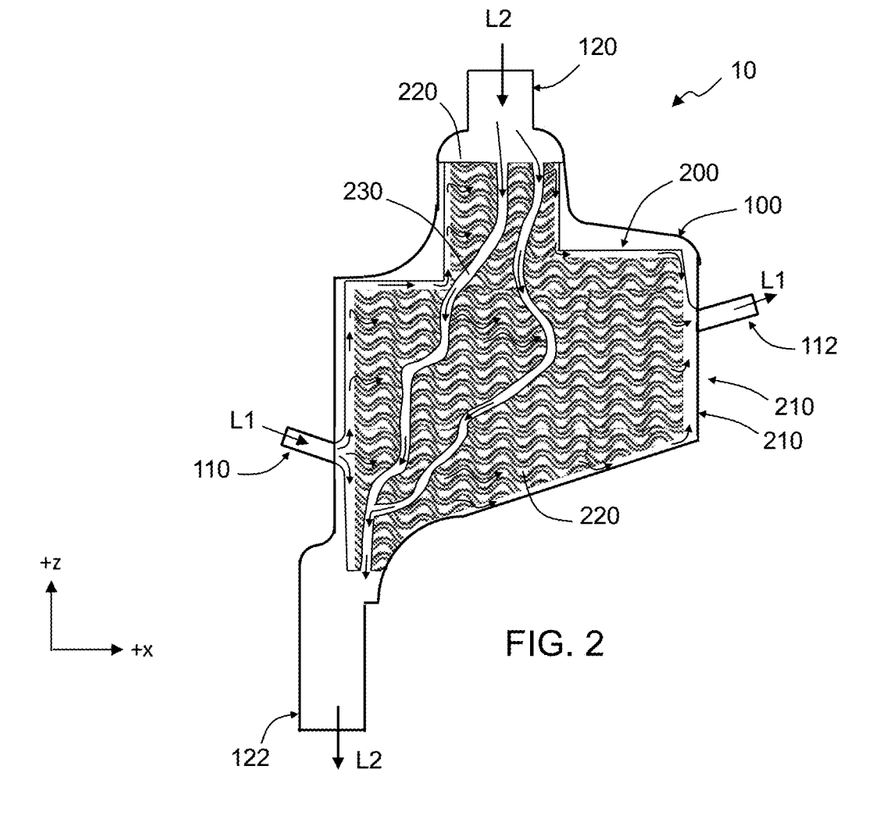
FIG. 2 is a cross sectional view of the heat exchanger in FIG. 1 showing a convoluted flow matrix according to the teachings of the present disclosure.

Referring to FIG. 2, a cross-sectional view of section 2-2 in FIG. 1 is shown. The housing 100 includes a convoluted flow matrix 200 through which a first fluid L1 and a second fluid L2 flow. As used herein, the term "convoluted" refers to a non-repeating or non-periodic pattern between an inlet and an outlet and the phrase "convoluted flow matrix" refers to a matrix with fluid passageways that are folded and twisted in a non-repeating manner between an inlet and an outlet of the matrix. Also, as used herein the term "periodic" refers to geometric features such as shapes and thicknesses that appear or occur at regular or equally spaced intervals (distances from each other) and the term "non-periodic" refers to geometric features such as shapes and thicknesses that do not appear or occur at regular or equally spaced intervals.

Figure 3:
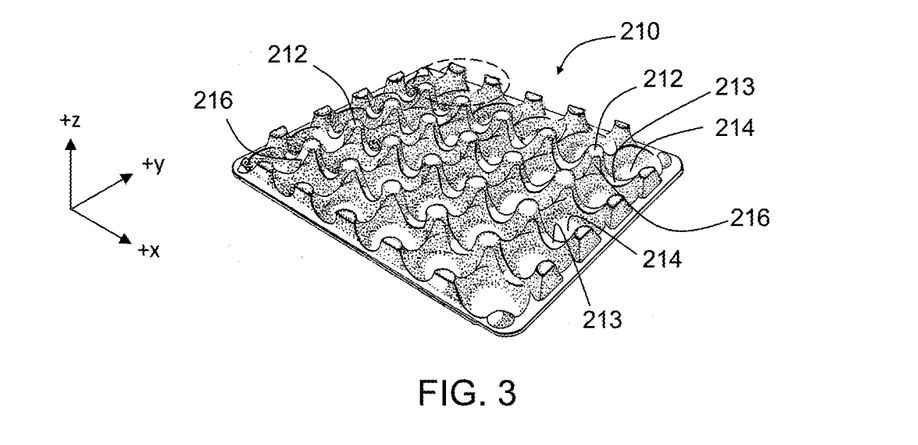
FIG. 3 is a perspective view of a convoluted layer according to the teachings of the present disclosure.

As shown in FIG. 2, the convoluted flow matrix 200 comprises a plurality of convoluted layers 210 with an example of one of the convoluted layers 210 shown in FIG. 3. A plurality of first fluid passageways 220 are defined between adjacent convoluted layers 210 and a plurality of second fluid passageways extend transversely (z-direction) through the plurality of convoluted layers 210. Each of the convoluted layers 210 includes a plurality of peaks 212 (FIG. 3) and a plurality of ridges 213 extending between adjacent peaks 212. In some variations, a depression 214 is defined and positioned between at least two peaks 212, sometimes between at least three peaks 212, and sometimes between at least four peaks 212. Also, a wall 216 is defined between the peaks 212, ridges 213, and depressions 214 as shown in FIG. 3. It should be understood that the ridges 213 are lower (-z direction) than the peaks 212 and the depressions 214 are lower (-z direction) than the ridges 213. It should also be understood that while the plurality of convoluted layers 210 shown in the figures may appear to show a periodic pattern for the plurality of first fluid passageways 220 defined between adjacent convoluted layers 210, the plurality of first fluid passageways 220 are not periodic.

Figure 4:
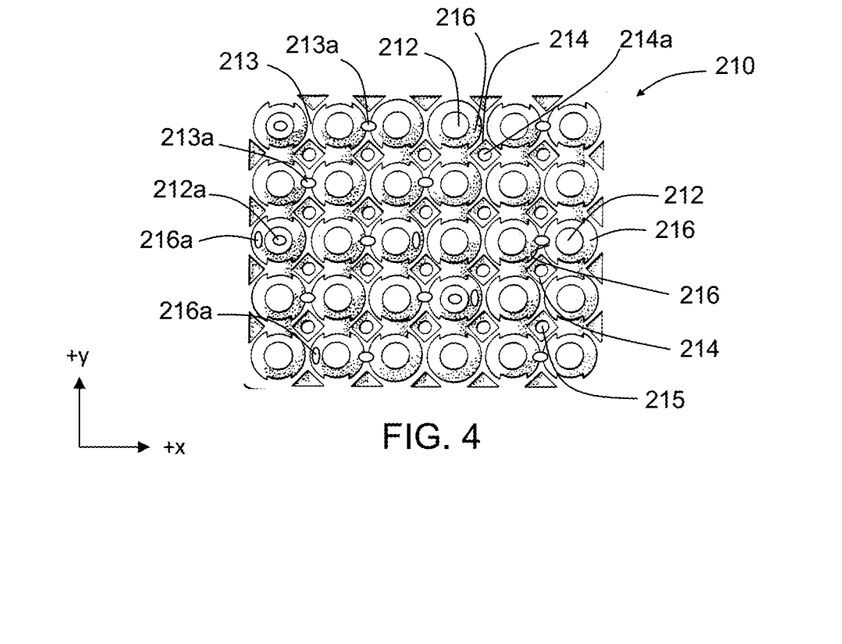
FIG. 4 is a top view of the convoluted layer in FIG. 3.

Referring to FIG. 4, a top view of the convoluted layer 210 in FIG. 3 is shown. It should be understood that while the top view of the convoluted layer 210 appears periodic in the x-y plane, in some variations the convoluted layer 210 is not periodic in the x-y plane. Also, in some variations at least some of the peaks 212 have an opening 212a, at least some of the ridges 213 have an opening 213a, at least some of the depressions 214 have an opening 214a, and/or at least some of the walls 216 have an opening 216a extending transversely (z-direction) through the convoluted layer 210 such that fluid can flow transversely through the plurality of convoluted layers 210. Particularly, the plurality of second fluid passageways 230 extend through the openings 212a, 213a, 214a, and/or 216a. Stated differently, fluid flowing through the plurality of second fluid passageways 230 flows through the openings 212a, 213a, 214a, and/or 216a.

Figure 5:
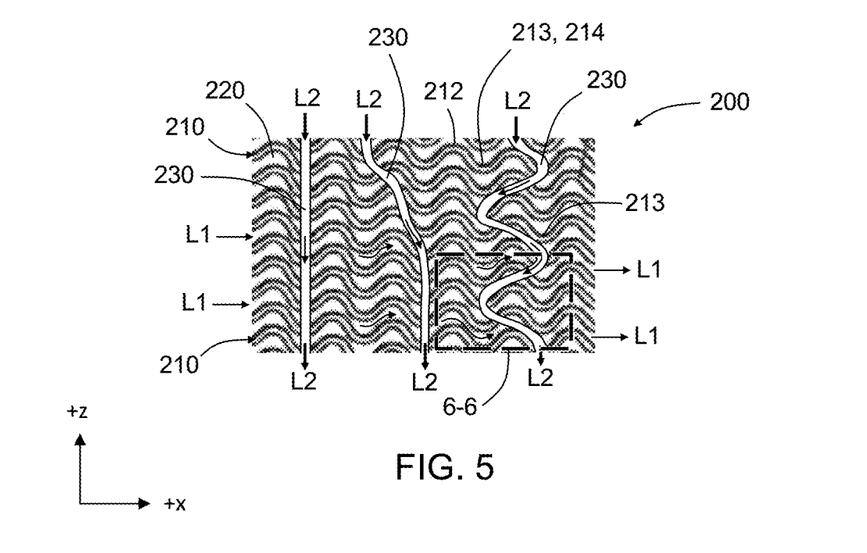
FIG. 5 is an enlarged side view of the convoluted flow matrix in FIG. 2 showing flow passageways of a first fluid and a second fluid according to the teachings of the present disclosure.

Referring now to FIG. 5, an isolated view of flow of the first fluid L1 and flow of the second fluid L2 through the convoluted flow matrix 200 is shown. Particularly, the first fluid L1 flows through the first fluid passageways 220 between adjacent convoluted layers 210 in a direction from the first fluid inlet 110 to the first fluid outlet 112, and the second fluid L2 flows through the plurality of convoluted layers 210 via second fluid passageways 230 in a direction from the second fluid inlet 120 to the second fluid inlet 122.

Figure 6:
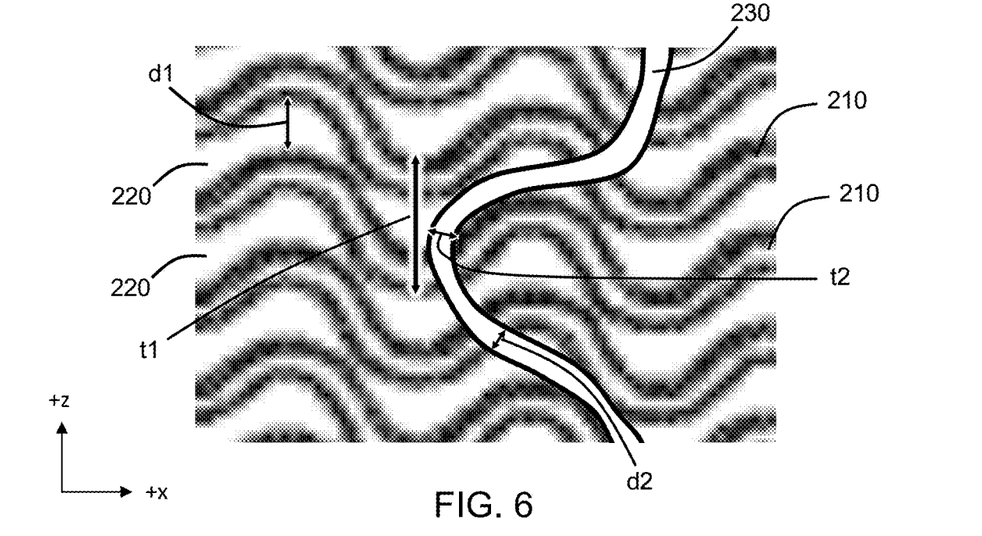
FIG. 6 is an enlarged side view of the convoluted flow matrix in FIG. 5 showing a convoluted flow matrix according to the teachings of the present disclosure.

Referring to FIG. 6, an enlarged view of section 6-6 with the first fluid passageway 220 and one of the second fluid passageway 230 in FIG. 5 is shown. Particularly, and in some variations of the present disclosure, at least one of the first fluid passageways 220 has a non-uniform or change in an inner dimension 'd1' along a length direction (x-direction in the figures) of the first fluid passageways 220. Also, and in at least one variation, at least one the first fluid passageways 220 has a non-uniform or change in an outer dimension 't1' along a length direction of the first fluid passageways 220. In some variations, all of the first fluid passageways 220 have a non-uniform or change in the inner dimension 'd1' along a length direction of the first fluid passageways 220 and/or all of the first fluid passageways 220 have a non-uniform or change in the outer dimension TV along a length direction of the first fluid passageways 220.

Still referring to FIG. 6, in some variations at least one of the second fluid passageways 230 has a non-uniform or change in an inner dimension 'd2' along a length direction of the second fluid passageways 230 (z-direction in the figures) and/or at least one the second fluid passageways has a non-uniform or change in an outer dimension 't2' along a length direction of the second fluid passageways 230. In at least one variation, all of the second fluid passageways 230 have a non-uniform or change in the inner dimension 'd2' along a length direction of the second fluid passageways 230 and/or all of the second fluid passageways 230 have a non-uniform or change in the outer dimension 't2' along a length direction of the second fluid passageways 230.

Figure 7A:
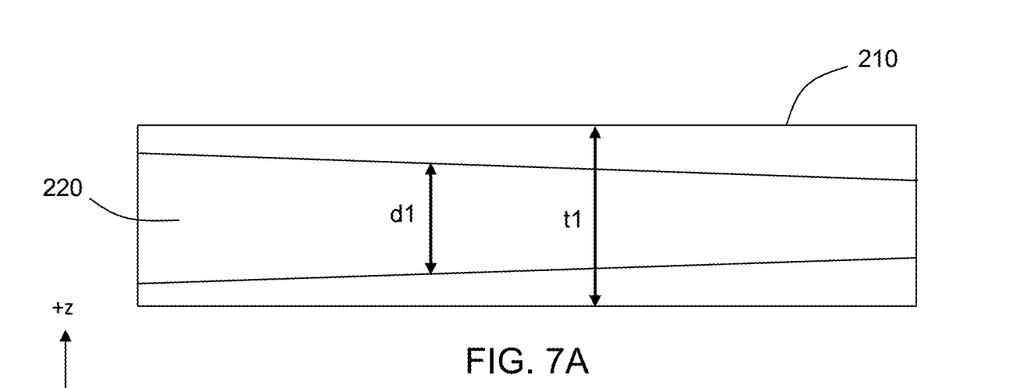
FIG. 7A is a side view of a fluid passageway with a change in an inner dimension.
Figure 7B:
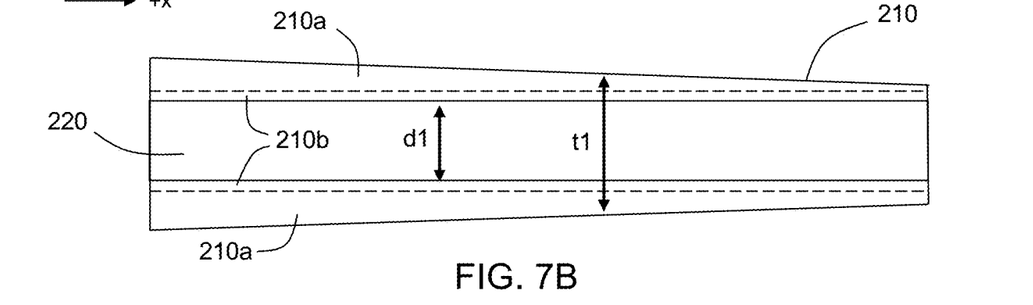
FIG. 7B is a side view of a fluid passageway with a change in an outer dimension.

Referring to FIGS. 7A and 7B, enlarged views of a first fluid passageway 220 are shown. In FIG. 7A, the first fluid passageway 220 has an inner dimension d1 that changes along a length direction of the first flow passageway, and an outer dimension t1 that is constant. And in FIG. 7B, the a first fluid passageway 220 has an inner dimension d1 that is constant and an outer dimension t1 that changes along a length direction of the first fluid passageway 220. It should be understood that in some variations the inner dimension d1 and the outer dimension t1 vary along the length of the first passageway 220. Also, it should be understood that the inner dimension d2 and outer dimension t2 of the second passageways 230 vary similarly as described above for the inner dimension d1 and the outer dimension t1.

It should be understood that the flexibility of AM the convoluted layers and the fluid passageways according to the teachings of the present disclosure provides heat transfer and heat dissipation customization as a function of spatial location for a given heat exchanger and/or its convoluted flow matrix. For example, the size of a fluid passageway and/or thickness(es) of adjacent convoluted layers at, or proximate to, a heated fluid inlet are designed and manufactured as a function of flow rate, thermal properties, and temperature (or temperature range) for a heated fluid entering a heat exchanger. And the size of the fluid passageway and/or thickness(es) of adjacent convoluted layers is altered, i.e., changed, with distance from the heated fluid inlet and as a function of the reduced temperature of the heated fluid as it flows through the convoluted flow matrix. Similarly, the size of a fluid passageway and/or thickness(es) of adjacent convoluted layers at, or proximate to, a coolant inlet are designed and manufactured as a function of flow rate, thermal properties, and temperature (or temperature range) of a coolant entering the heat exchanger. And the size of the fluid passageway and/or thickness(es) of the adjacent convoluted layers is altered, i.e., changed, with distance from the coolant inlet and as a function of the increased temperature of the coolant as it flows through the convoluted flow matrix.

In this manner, enhanced heat transfer is provided throughout the convoluted flow matrix. That is, a reduction in unused or reduced use "space" (i.e., area and/or volume) that would be present in a traditional heat exchanger is provided, and thus the size(s) of a given traditional heat exchanger is reduced using the AM heat exchangers according to the teachings of the present disclosure.

In addition a first portion of the convoluted flow matrix 200 can be formed from a first metallic material and a second portion of the convoluted flow matrix 200 is formed from a second metallic material such that the thermal conductivity of different metallic materials is used to customize the heat transfer within a given heat exchanger. For example, the upper (+z direction) convoluted layer 210 in FIG. 7A can be formed from a first metallic material (e.g., steel) and the lower (-z direction) can be formed from a second metallic material (e.g., copper). In the alternative, or in addition to, a first portion 210a of the convoluted layers 210 forming the first fluid passageway 220 in FIG. 7B (and other fluid passageways disclosed herein) can be a first metallic material (e.g., copper) and the second portion 210b of the convoluted layers 210 forming the first fluid passageway 220 in FIG. 7B can be a second metallic material (e.g., steel). Accordingly, it should be understood that the heat transfer properties of heat exchanger according to the teachings of the present disclosure have customized or "finetuned" heat transfer properties.

Figure 8:
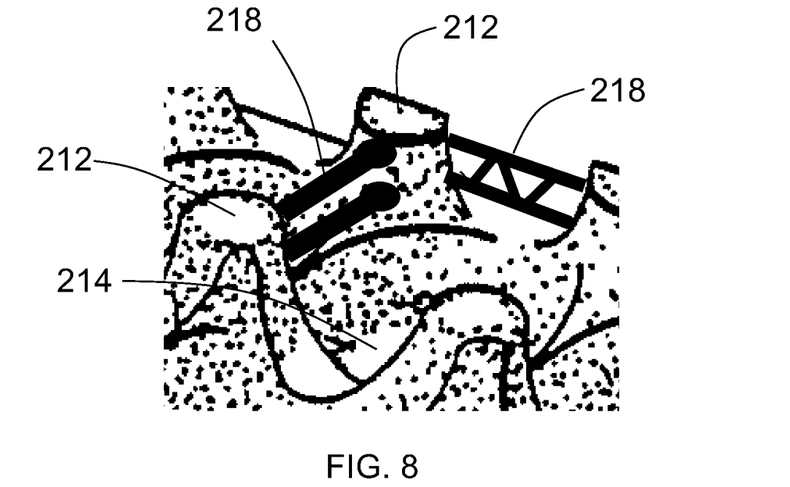
FIG. 8 is an enlarged perspective view of the convoluted layer in FIG. 3 showing internal flow path structures according to the teachings of the present disclosure.

Referring now to FIG. 8, in some variations, at least one of the first fluid passageways 220 and/or at least one of the second fluid passageways 230 (referred to herein collectively as "fluid passageway 220, 230") include internal structures 218. For example, FIG. 8 shows internal structures 218 in the form of rods or beams that extend between adjacent peaks 212. It should be understood that the internal structures 218 increase the surface area of a given fluid passageway 220, 230, at the expense of restricting flow, and thereby altering heat transfer of the fluid passageway 220, 230. In addition, the internal structures can provide support and/or strength to the fluid passageway 220, 230, the convoluted flow matrix 200, and the housing 100, among others.

Figure 9:
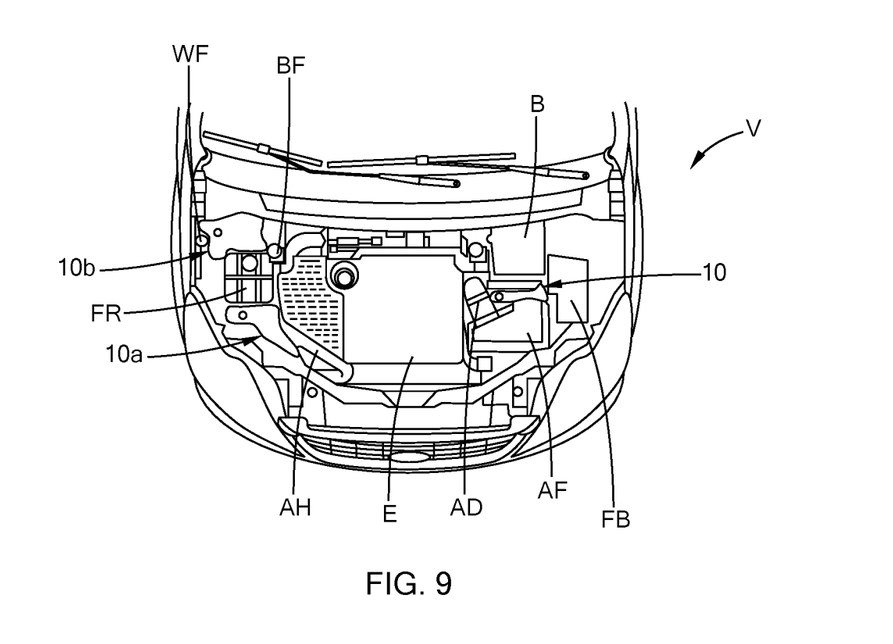
FIG. 9 is a top view of examples of heat exchangers positioned within a vehicle engine compartment according to the teachings of the present disclosure.

Referring to FIG. 9, non-limiting examples of heat exchangers included within or being part of a vehicle V according to the teachings of the present disclosure are shown. Particularly, in one example the heat exchanger 10 is positioned between an air filter housing 'AF', a fuse box 'FB', a battery 'B', and an air intake duct 'AD' of an internal combustion engine 'E'. In another example, a heat exchanger 10a according to the teachings of the present disclosure is positioned between a radiator antifreeze hose 'AH', a frame member 'FM', and a fluid reservoir 'FR'. In still another example, a heat exchanger 10b according to the teachings of the present disclosure is positioned between the fluid reservoir FR, a windshield wiper fluid reservoir 'WF', and a brake fluid reservoir 'BF'. Accordingly, it should be understood that the AM design and manufacture of the heat exchangers 10, 10a, and 10b, provide a shape and size that are customized to fit within available space in a vehicle, e.g., within an irregular shaped space in a vehicle engine compartment. Such flexibility in the design and manufacture of heat exchangers enhances or increases the available locations and positions where such heat exchangers can be attached and used for fluid cooling purposes. Such flexibility in design and manufacture also decreases the weight of such heat exchangers.

While the heat exchanger 10 (and heat exchangers 10a, 10b) are shown as stand-alone units, it should be understood that the flexibility of heat exchanger design and manufacture according to the teachings of the present disclosure allow for a heat exchange to be incorporated within an already existing component. For example, and with reference to FIG. 10, a heat exchanger 12 with a convoluted flow matrix 200 is shown within a separate component or part 250. The separate part 250 has an outer wall 252 and an inner wall 254. The first fluid L1 flows within the inner wall 254 and through the first fluid passageways 220 of the convoluted flow matrix 200, and the second fluid L2 flows between the outer wall 252 and the inner wall 254 and through the second fluid passageways 230. Non-limiting examples of the separate part 250 include oil lines, fuel lines, coolant lines (e.g., a radiator hose), brake fluid lines, engine oil pans (e.g., engine oil reservoirs), gearbox oil reservoirs, radiators, brake fluid reservoirs, among others. In addition, in some variations the heat exchanger 12 within the separate part 250 is self-contained (i.e., does receive and/or provide fluid to the separate part). That is, the heat exchanger 12 uses available space within the separate 250 for packaging of the heat exchanger 12 and thereby saves space (and weight) within an engine compartment.

Figure 10:
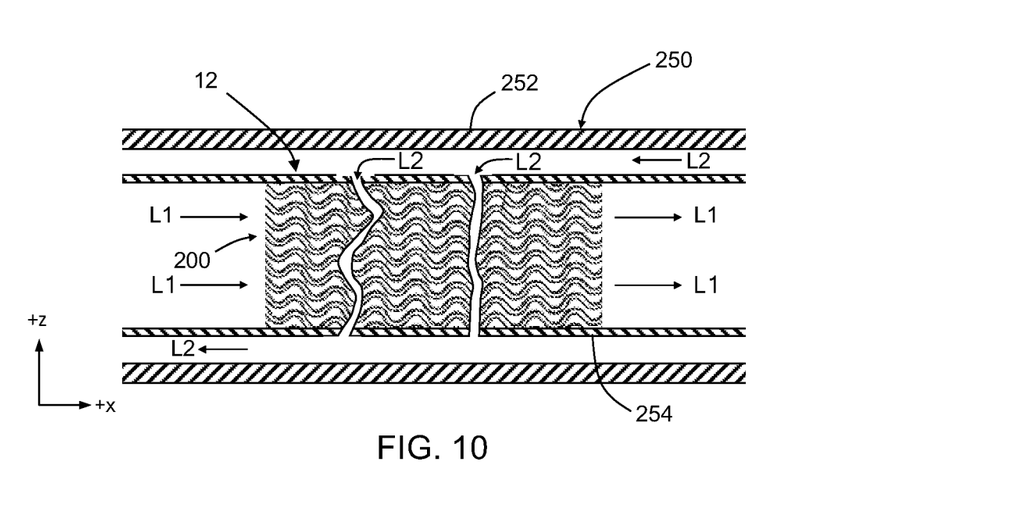
FIG. 10 is a side view of a heat exchanger disposed within a fluid line according to the teachings of the present disclosure.
Figure 11:
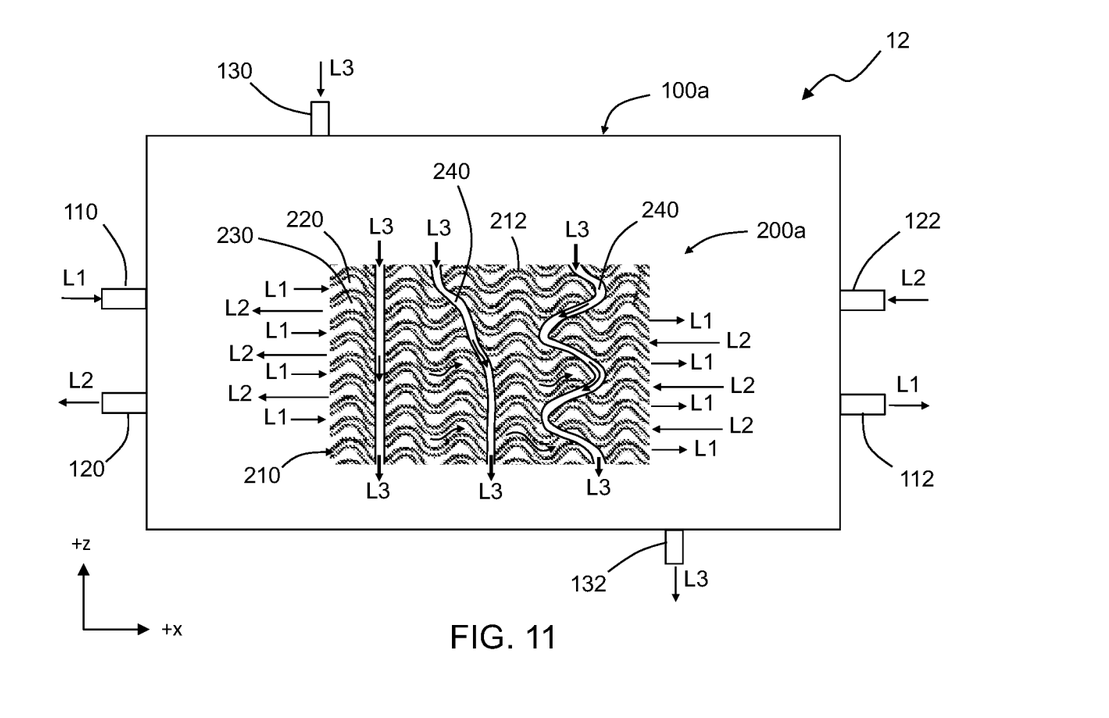
FIG. 11 is a side view of a heat exchanger according to another form of the present disclosure.

While FIGS. 2, 5, and 10 show examples of heat exchangers and convoluted flow matrices that have two fluids flowing therethrough, it should be understood that the flexibility and manufacture of AM heat exchangers according to the teachings of the present disclosure provide heat exchangers having more than two fluids flowing therethrough. One non-limiting example is shown in FIG. 11 where like reference numerals refer to like elements disclosed and described in FIGS. 1-10. Particularly a heat exchanger 12 with a monolithic housing 100a, a first fluid inlet 110, a first fluid outlet 112, a second fluid inlet 120 and a second fluid outlet 122 is shown. In addition, the housing 100a includes a third fluid inlet 130, a third fluid outlet 132 and a convoluted flow matrix 200a with second fluid passageways 230 adjacent convoluted layers 210 such that the second fluid L2 flows counter to the first fluid L1. Also, a third fluid L3 flows transverse (−z direction) to the convoluted layers 210 through a plurality of third fluid passageways 240. Accordingly, the heat exchanger 12 provides cooling to more than one fluid and, as such, the heat exchanger 12 cools multiple fluids, thereby saving cost, weight and space of a vehicle employing such a heat exchanger. Non-limiting examples of the first fluid L1, the second fluid L2, and the third fluid L3, include air, water, antifreeze, coolants other than water, engine oil, transmission oil, brake fluid, among others.

Though not shown in FIG. 11, it should be understood that passageways, headers, and the like, that provide for the flow of the first fluid L1 from the first fluid inlet 110 to the plurality of first fluid passageways 220 and from the first fluid passageways 220 to the first fluid outlet 112 are included in the housing 100a. Similarly, passageways, headers, and the like, that provide for the flow of the second fluid L2 from the second fluid inlet 120 to the plurality of second fluid passageways 230 and from the second fluid passageways 230 to the second fluid outlet 122 are included in the housing 100a. And passageways, headers, and the like, that provide for the flow of the third fluid L3 from the third fluid inlet 130 to the plurality of third fluid passageways 240 and from the third fluid passageways 240 to the third fluid outlet 132 are included in the housing 100a.

It should be understood that AM heat exchangers with custom shapes and heat dissipation properties after provided according to the teachings of the present disclosure. Such heat exchangers can be designed and manufactured after the remaining components of a system have been designed and/or manufactured. In addition, varying the internal and/or external dimensions of the fluid passageways allows for heat transfer and heat dissipation as a function of spatial location of a given heat exchanger to be customized and/or enhanced. Such customization and/or enhancing allows for smaller and more efficient heat exchangers to be design and manufactured.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An additively manufactured (AM) heat exchanger comprising:
    an AM monolithic housing defining a convoluted flow matrix in which a plurality of adjacent layers including a plurality of ridges, a plurality of depressions, and a plurality of openings that define a plurality of fluid passageways that are arranged in a non-repeating or non-periodic pattern between an inlet and an outlet, the plurality of fluid passageways comprising at least one first fluid passageway defined between at least one of the plurality of ridges and at least one of the plurality of depressions and extending between a first fluid inlet and a first fluid outlet, and at least one second fluid passageway defined through at least one of the plurality of openings and extending between a second fluid inlet and a second fluid outlet, the at least one first fluid passageway and the at least one second fluid passageway arranged in the non-repeating or non-periodic pattern.

2. The AM heat exchanger according to claim 1 further comprising a first fluid flowing through the at least one first fluid passageway and a second fluid flowing through the at least one second fluid passageway.

3. The AM heat exchanger according to claim 1, wherein the convoluted flow matrix comprises at least one of a change in inner dimension along a length direction of the at least one first fluid passageway, a change in inner dimension along a length direction of the at least one second fluid passageway, a change in outer dimension along a length direction of the at least one first fluid passageway, a change in outer dimension along a length direction of the at least one second fluid passageway, and combinations thereof.

4. The AM heat exchanger according to claim 3, wherein the change in inner dimension along the length direction of the at least one first fluid passageway is a change in an inner diameter of the at least one first fluid passageway, the change in inner dimension along the length direction of the at least one second fluid passageway is a change in an inner diameter of the at least one second fluid passageway, the change in outer dimension along the length direction of the at least one first fluid passageway is a change in wall thickness of the convoluted flow matrix along the length of the at least one first fluid passageway, and the change in outer dimension along the length direction of the at least one second fluid passageway is a change in wall thickness of the convoluted flow matrix along the length of the at least one second fluid passageway.

5. The AM heat exchanger according to claim 1, wherein a cross section of an outer surface of the monolithic housing defines an irregular shape.

6. The AM heat exchanger according to claim 5, wherein the irregular shape of the monolithic housing is complimentary to an irregular shaped space within a vehicle.

7. The AM heat exchanger according to claim 1, wherein the monolithic housing is a metallic monolithic housing.

8. The AM heat exchanger according to claim 7, wherein the metallic monolithic housing comprises a first portion formed from a first metallic material and a second portion formed from a second metallic material different than the first metallic material.

9. The AM heat exchanger according to claim 1, wherein the monolithic housing comprises a plurality of heat exchangers.

10. The AM heat exchanger according to claim 9, wherein the plurality of heat exchangers is selected from a gearbox oil heat exchanger, an engine oil heat exchanger, an engine coolant heat exchanger, an exhaust gas heat exchanger, and a battery coolant heat exchanger.

11. The AM heat exchanger according to claim 1, wherein the AM monolithic housing is disposed in a fuel line of a vehicle.

12. The AM heat exchanger according to claim 1, wherein the AM monolithic housing is disposed in an oil line of a vehicle.

13. The AM heat exchanger according to claim 1, wherein the AM monolithic housing is disposed in an oil reservoir of a vehicle.

14. The AM heat exchanger according to claim 1 further comprising a vehicle, wherein the monolithic housing is at least one of a gearbox oil heat exchanger, an engine oil heat exchanger, an engine coolant heat exchanger, an exhaust gas heat exchanger, and a battery coolant heat exchanger for the vehicle.

15. The AM heat exchanger according to claim 14 wherein the monolithic housing is at least two of the gearbox oil heat exchanger, the engine oil heat exchanger, the engine coolant heat exchanger, the exhaust gas heat exchanger, and the battery coolant heat exchanger for the vehicle.

16. The AM heat exchanger according to claim 14, wherein the vehicle comprises an irregular shaped space between at least two components of the vehicle and the monolithic housing is complimentary with and disposed within the irregular shaped space.

17. An additively manufactured (AM) heat exchanger comprising:
a monolithic housing with a plurality of adjacent convoluted layers including a plurality of openings defining a plurality of coolant passageways extending between a coolant inlet and a coolant outlet and a plurality of ridges and a plurality of depressions that define a plurality of heated fluid passageways extending between a heated fluid inlet and a heated fluid outlet, wherein the plurality of coolant passageways and the plurality of heated fluid passageways define a convoluted flow matrix within the monolithic housing in which the plurality of coolant fluid passageways and the plurality of heated fluid passageways are arranged in a non-repeating or non-periodic pattern.

18. The AM heat exchanger according to claim 17, wherein the convoluted flow matrix comprises:
a coolant passageway with at least one of a change in an inner dimension along a length direction of the coolant passageway, a change in an outer dimension along the length direction of the coolant passageway, and a change in the inner dimension and the outer dimension along the length direction of the coolant passageway; and
a heated fluid passageway with at least one of a change in an inner dimension along a length direction of the heated fluid passageway, a change in an outer dimension along the length direction of the heated fluid passageway, and a change in the inner dimension and the outer dimension along the length direction of the heated fluid passageway.

19. An additively manufactured (AM) heat exchanger comprising:
a monolithic housing defining an outer surface, a plurality of adjacent layers including a plurality of ridges and a plurality of depressions that define a plurality of first fluid passageways extending between a first fluid inlet and a first fluid outlet and a plurality of openings that define a plurality of second fluid passageways extending between a second fluid inlet and a second fluid outlet, wherein:
a cross section of the outer surface defines an irregular shape;
the plurality of first fluid passageways and the plurality of second fluid passageways define a convoluted flow matrix within the monolithic housing in which the plurality of first fluid passageways and the plurality of second fluid passageways are arranged in a non-repeating or non-periodic pattern; and the outer surface of the monolithic housing is complimentary to a space between at least two components of a vehicle.

20. The AM heat exchanger according to claim 19, wherein the monolithic housing further comprises a plurality of third fluid passageways extending between a third fluid inlet and a third fluid outlet.

\* \* \* \* \*